United States Patent
Kawasumi

(10) Patent No.: US 10,996,613 B2
(45) Date of Patent: May 4, 2021

(54) IMAGE FORMING APPARATUS HAVING REMOVABLE DUCT AND FILTER

(71) Applicant: CANON KABUSHIKI KAISHA, Tokyo (JP)

(72) Inventor: Ryoichi Kawasumi, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/805,221

(22) Filed: Feb. 28, 2020

(65) Prior Publication Data

US 2020/0201239 A1   Jun. 25, 2020

Related U.S. Application Data

(63) Continuation of application No. PCT/JP2018/032791, filed on Aug. 29, 2018.

(30) Foreign Application Priority Data

Aug. 29, 2017   (JP) .............................. JP2017-164082

(51) Int. Cl.
*G03G 21/00* (2006.01)
*G03G 21/20* (2006.01)

(52) U.S. Cl.
CPC ....... *G03G 21/0052* (2013.01); *G03G 21/206* (2013.01); *G03G 2221/0094* (2013.01)

(58) Field of Classification Search
USPC ......................................................... 399/92
See application file for complete search history.

(56) References Cited

U.S. PATENT DOCUMENTS

| 2012/0177397 A1 | 7/2012 | Pitas et al. |
| 2012/0243899 A1* | 9/2012 | Ryuzaki ............... G03G 21/206 399/92 |
| 2018/0147517 A1* | 5/2018 | Kurita ................ B01D 46/0001 |
| 2018/0292782 A1 | 10/2018 | Nojima |
| 2020/0201238 A1 | 6/2020 | Kawasumi |

FOREIGN PATENT DOCUMENTS

| JP | 07-134522 A | 5/1995 |
| JP | 10-268716 A | 10/1998 |
| JP | 2006-215309 A | 8/2006 |
| JP | 2011-180340 A | 9/2011 |
| JP | 2015-141341 A | 8/2015 |
| WO | 2017/115877 A1 | 7/2017 |

OTHER PUBLICATIONS

International Search Report and Written Opinion dated Nov. 13, 2018, in International Patent Application No. PCT/JP2018/032791.

* cited by examiner

*Primary Examiner* — Q Grainger
(74) *Attorney, Agent, or Firm* — Venable LLP

(57) ABSTRACT

In opposition to a sheet feeding path, an ultrafine particle (UFP) collecting filter provided between transfer and fixing is easily exchanged. Therefore, a duct unit kept in a state of holding the UFP collecting filter is removably and easily mounted to a duct.

8 Claims, 12 Drawing Sheets

IMAGE FORMING APPARATUS HAVING REMOVABLE DUCT AND FILTER

TECHNICAL FIELD

The present invention relates to an image forming apparatus, for forming a toner image on a sheet, such as a copying machine, a printer, a facsimile machine and a multi-function machine having a plurality of functions of these machines.

BACKGROUND ART

In the image forming apparatus of an electrophotographic type, it has been known that a parting agent (wax) contained in toner is heated and is temporarily put in a state of ultrafine particles (Ultra Fine Particles: having a particle size of 100 nm or less, hereinafter referred to as UFP or dust). In Japanese Laid-Open Patent Application (JP-A) 2011-180340, a proposal such that a filter is provided in a path along which the dust is discharged to an outside of the apparatus through a discharge (exhaust) duct and such dust is collected has been made.

However, in the apparatus described in JP-A 2011-180340, a duct arrangement free from an influence on sheet feeding is prioritized, so that a dust reducing effect is reduced.

SUMMARY OF THE INVENTION

Problem to be Solved by the Invention

An object of the present invention is to enhance a dust reducing effect.

Means for Solving the Problem

According to an aspect of the present invention, there is provided an image forming apparatus comprising: an image forming portion for forming a toner image on a sheet in a first position by using toner containing a parting agent; a fixing portion for thermally fixing the toner image, in a second position, formed on the sheet by the image forming portion; a duct, including a suction port provided opposed to a sheet feeding path between the first position and the second position, for discharging air to an outside of the image forming apparatus; a filter, provided in the suction port of the duct, for collecting particles of a predetermined particle size resulting from the release agent; a holder holding the filter; and an engaging portion for removably engaging, with the duct, the holder holding the filter.

EMBODIMENTS FOR CARRYING OUT THE INVENTION

Figure 1:
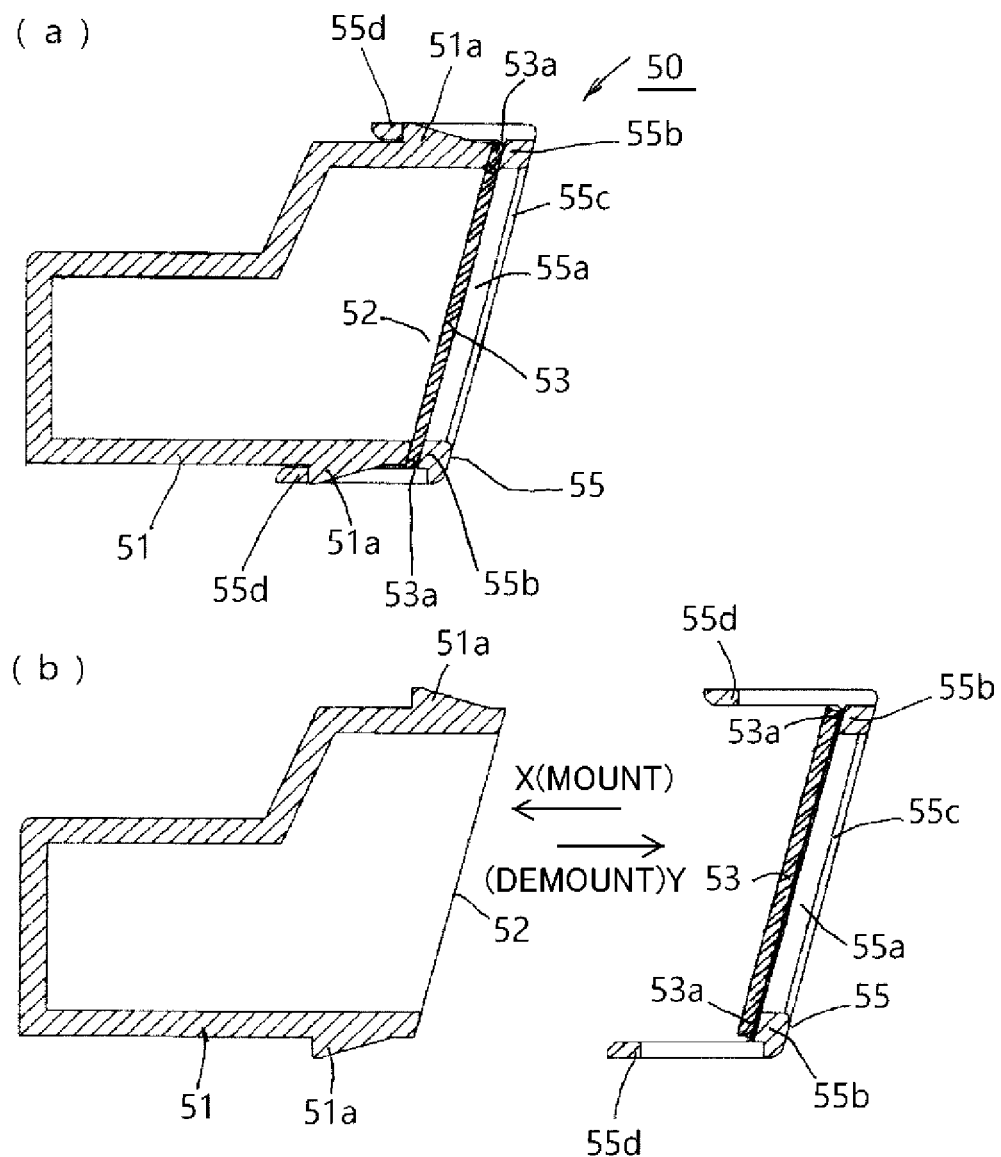
In FIG. 1, part (a) is an enlarged sectional view seen in an arrow direction of (a)-(a) line of FIG. 8, and part (b) is an enlarged sectional view showing a state in which a frame member provided with a filter is removed from a duct in part (a).

In the following, embodiments of the present invention will be described while making reference to the drawings. Members and portions common to respective figures are represented by the same reference numerals or symbols.

Embodiment 1

(Image Forming Apparatus)

Figure 2:
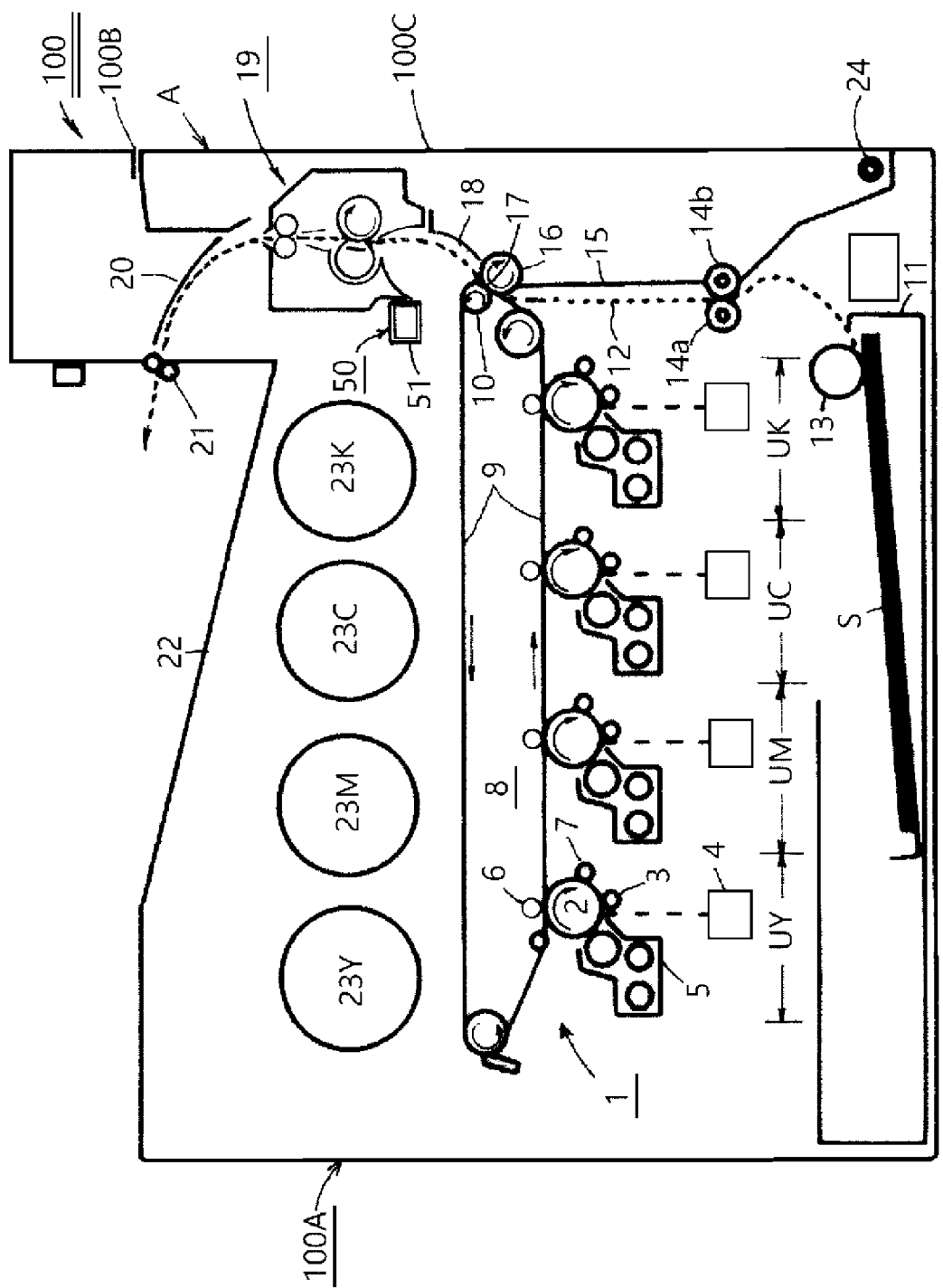
FIG. 2 is a schematic structural view of an example of an image forming apparatus.

FIG. 2 is a schematic longitudinal front view of an image forming apparatus 100 in this embodiment. In the following description, a front surface (front, front side) of the image forming apparatus 100 is a front side on the drawing sheet of FIG. 2, and a rear surface (rear, rear side) is a side opposite from the front side. Left and right is left and right when the apparatus 100 is seen from the front side (surface). Upper and lower are upper and lower with respect to a direction of gravitation. Upstream and downstream are upstream and downstream with respect to a sheet feeding direction.

This image forming apparatus is a four-color-based full-color laser printer of a tandem type-intermediary transfer type, and carries out toner image formation on a sheet on the basis of image information inputted from an external host device (not shown) such as a personal computer to a control circuit portion (not shown).

An image forming portion 1 in an inside of an image forming apparatus main assembly (apparatus frame: hereinafter referred to as an apparatus main assembly) 100A includes first to fourth (four) image forming units U (UY, UM, UC, UK). Further, the image forming portion 1 includes an intermediary transfer belt unit 8 and a sheet cassette 11 on an upper side and a lower side, respectively, of the first to fourth image forming units U.

The first to fourth image forming units U form toner images of four colors consisting of yellow (Y), magenta (M) and cyan (C) which are three primary colors of subtractive color mixture of back (K). Each image forming unit U includes a rotation drum-type electrophotographic photosensitive member (hereinafter referred to as a drum) 2 as an image bearing member. Further, the image forming unit U includes, as process means actable on the drum 2, a charging roller 3, a laser scanner (exposure device) 4, a developing device 5, a primary transfer roller 6 and a drum cleaner 7.

Incidentally, in order to avoid complication of the figure, representation of reference numerals for these devices in the image forming units UM, UC and UK other than the first image forming unit UY is omitted. Further, an electrophotographic image forming operation of the image forming portion 1 including these image forming units UY, UM, UC and UK and the intermediary transfer roller unit 8 is well known and therefore description thereof will not be provided.

The toner images of the respective colors described above are primary-transferred successively in a predetermined superposed manner from the drums 2 of the first to fourth image forming units U onto a rotating intermediary transfer belt (intermediary transfer member) 9. By this, superposed toner images of the four colors of Y+M+C+K are formed on the belt 9.

On a right side of the inside of the apparatus main assembly 100A, an upward feeding path 12 for feeding a sheet S from below toward above is provided. In this feeding path 12, in the order from a lower side to an upper side, a sheet feeding roller 13, a registration roller pair 14a and 14b, a secondary transfer roller 16, a fixing device (fixing apparatus) 19 and a (sheet) discharging roller 21 are provided. The secondary transfer roller 16 is contacted to the belt 9 toward a belt winding roller 10 with a predetermined urging force on a right side of the intermediary transfer belt unit 8 and forms a secondary transfer nip (portion) 17 in cooperation with the belt 9.

Reference numerals 15, 18 and 20 represent guiding members for guiding the sheet S in the feeding path 12. The guiding member 15 is provided between the registration roller pair 14a and 14b and the secondary transfer roller 16. The guiding member 18 is provided between the secondary transfer roller 16 and the fixing device 19. The guiding member 20 is provided between the fixing device 19 and the discharging roller 21.

The feeding roller 13 is driven at predetermined control timing, so that a single sheet S is separated and fed from the sheet cassette 11 and is guided into the feeding path 12. Then, the sheet S is guided into the secondary transfer nip 17 at predetermined control timing by the registration roller pair 14a and 14b and is nipped and fed. By this, the superposed four color toner images on the belt 9 are secondary-transferred and formed collectively onto the sheet S at the secondary transfer nip 17.

The sheet S coming out of the secondary transfer nip 17 is guided to the fixing device 19 functioning as a fixing portion and is subjected to a heat-fixing process of the toner images. The fixing device 19 is the fixing portion for fixing the toner images, formed on the sheet S at the secondary transfer nip (first position) 17 of the image forming portion 1, at a fixing nip (second position) N (FIG. 3) by heat and pressure. The sheet S coming out of the fixing device 19 is discharged as an image-formed product onto a (sheet) discharge tray 22 which is an upper surface portion of the apparatus main assembly 100A by the discharging roller pair 21.

Reference symbols 23Y, 23M, 23C and 23K represent toner bottles which accommodate replenishing toners to the developing devices 5 of the first to fourth image forming units UY, UM, UC and UK, respectively, and which are capable of exchange through mounting and demounting, and are provided above the intermediary transfer belt unit 8. Toner supply in an appropriate amount is timely made by a toner supplying mechanism (not shown) from the toner bottle corresponding to each of the developing devices 5 of the respective image forming units UY, UM, UC and UK.

(Fixing Device)

Figure 3:
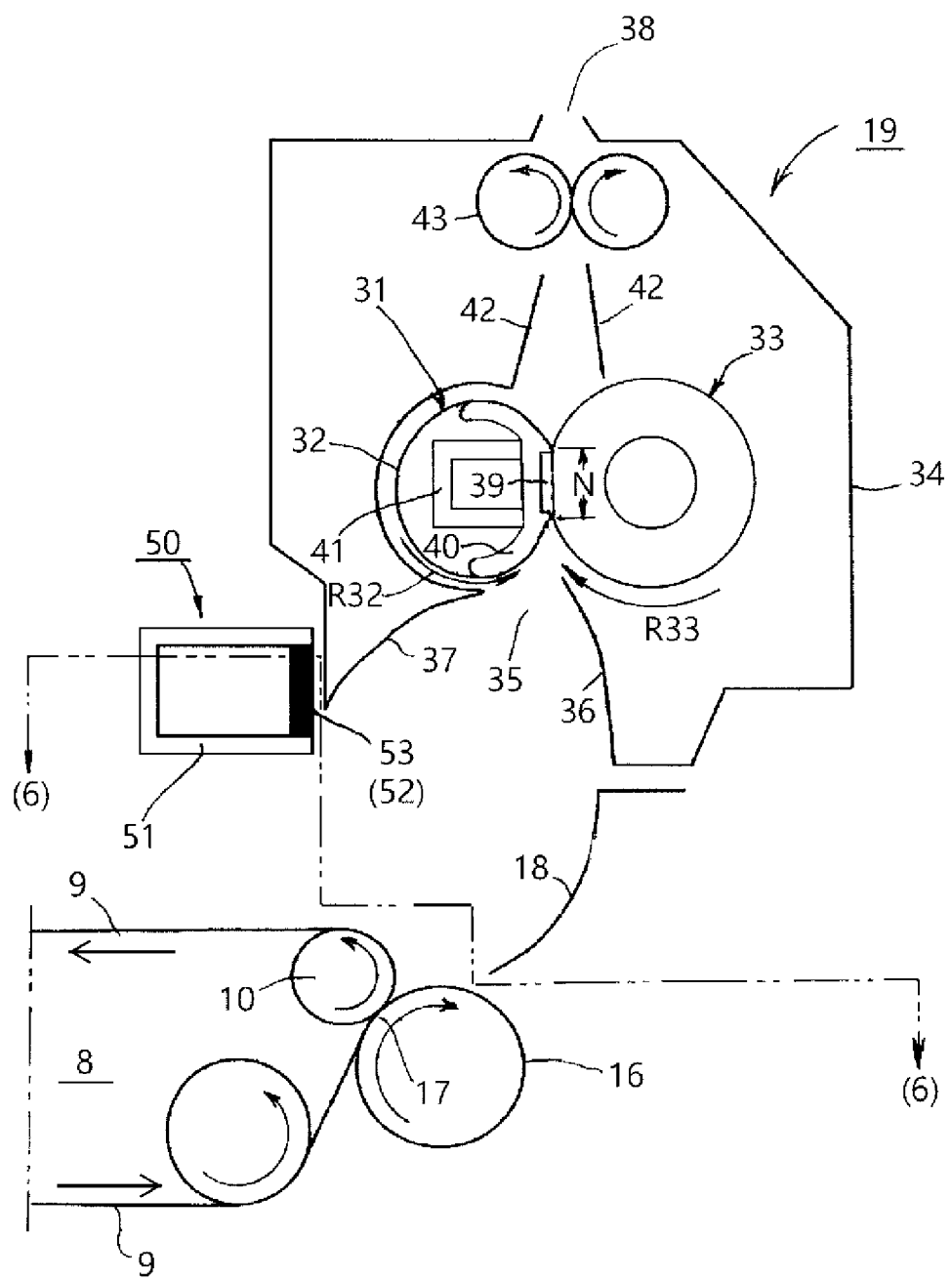
FIG. 3 is a partially enlarged schematic view of a principal part of FIG. 2.

FIG. 3 is a schematic enlarged view of a secondary transfer nip portion 17 and a fixing device 19 portion in FIG. 2. The fixing device 19 in this embodiment is an on-demand fixing device (ODF fixing device) of a belt heating type-pressing member driving type. A basis structure and a fixing operation of this fixing device are well known and therefore explanation thereof will be briefly made.

This fixing device 19 is roughly constituted by a belt unit 31 including a fixing belt (hereinafter referred to as a belt) 32 which is a first rotatable member, a pressing roller 33 which is a second rotatable member and which has elasticity, and a casing 34 accommodating these members. By the belt 32 and the pressing roller 33, the fixing nip N in which the sheet S carrying unfixed toner images is nipped and fed and in which the toner images are fixed by heat and pressure is formed.

The casing 34 is provided with a sheet entrance (sheet guiding port) 35 and a sheet exit (outlet) 38. The sheet entrance 35 is formed by a first guiding member 36 opposing a sheet back surface which is a non-toner image carrying surface of the sheet S and a second guiding member 37 opposing a sheet front surface which is a toner image carrying surface. The belt unit 31 and the pressing roller 33 are provided so that the sheet entrance 35 is positioned below the sheet exit 38 with respect to a direction of gravitation. The fixing device in this embodiment is constituted so as to feed the sheet S from below toward above with respect to the direction of gravitation, and this constitution is referred to as a vertical path structure.

In the belt unit 31, inside the belt 32, a fixing heater (heat source: hereinafter, referred to as a heater) 39, a heater holder (hereinafter, referred to as a holder) 40, a rigid stay (hereinafter, referred to as a stay) 41 and the like are provided.

The heater 39 is a heating source for heating the belt 32. Further, the heater 39 is an urging member for urging the belt 32 toward the pressing roller 33. As the heater 39, for example, a so-called ceramic heater is used. The heater 39 is disposed along a longitudinal direction (widthwise direction) of the belt 32. The heater 39 is disposed inside the belt 32 so as to be slidable on an inner surface of the belt 32.

The heater 39 generates heat by electric power supply from an energizing portion (not shown) and abruptly increases in temperature. A temperature of the heater 39 is detected by a temperature sensor (not shown) and is fed back to the control circuit portion (not shown). On the basis of detection temperature information inputted, the control circuit portion controls supply electric power from the energizing portion to the heater 39 so that the temperature of the heater 39 is increased to a predetermined target temperature and is (temperature-) controlled at the predetermined target temperature.

The holder 40 is a member for holding the heater 39 along the longitudinal direction thereof. The holder 40 fixes the heater 39 to the surface on the pressing roller 33 side. Further, the holder 40 is a guiding member for guiding a curvature shape of the belt 32 with respect to a circumferential direction so that the surface is easily separated from the belt 32. The hold 40 may desirably be excellent in heat-resistant property, and for example, a liquid crystal polymer can be used as the holder 40.

The stay 41 is a supporting member for supporting the holder 40 and the heater 39 along the longitudinal direction. The stay 41 is disposed on a side opposite from the pressing roller 33 while interposing the holder 40, the heater 39 and the belt 32 between itself and the pressing roller 33. The stay 41 is pressed toward the pressing roller 33 by a predetermined pressing force at opposite end portions with respect to a longitudinal direction thereof.

By such a constitution, the stay 41, the holder 40 and the heater 39 press the belt 32 toward the pressing roller 33 side. The elastic rubber layer of the pressing roller 33 against which the belt 32 is pressed is elastically deformed and has a shape following a surface of the heater 39. Thus, the fixing nip N with a predetermined width with respect to a sheet feeding direction is formed between the belt 32 and the pressing roller 33.

The pressing roller 33 is disposed so that a rotational axis direction (longitudinal direction) thereof is substantially parallel to the longitudinal direction (generatrix direction) of the belt 32. The pressing roller 33 is rotatably held via bearings by front and rear side plates (not shown) of the casing 34 at opposite portions of the longitudinal direction of a core metal.

The core metal of the pressing roller 33 is connected to a driving mechanism (not shown) including a motor which is a driving source, and is rotationally driven clockwise at a predetermined peripheral speed in an arrow direction R33 by drive of the motor. To the belt 32 in a press-contact state with the rotationally driven pressing roller 33 in the fixing nip N, drive of the pressing roller 33 is transmitted by a frictional force in the fixing nip N, so that the belt 32 is rotated counterclockwise in an arrow R32 direction by the pressing roller 33.

In a state in which the pressing roller 33 is rotationally driven and the heater 39 is raised and (temperature-)controlled to a predetermined target temperature, the sheet S on which the unfixed toner images are formed in the secondary transfer portion (first position) 17 of the image forming portion 1 is fed to the fixing device 19. Then, the sheet S enters the fixing device 19 through a sheet entrance 35 and is nipped and fed in the fixing nip (second position) N.

In this embodiment, the fixing device 19 is positioned above the intermediary transfer belt 9 with respect to a direction of gravitation, so that the fixing nip N is positioned above the secondary transfer nip 17 with respect to the direction of gravitation. Accordingly, the sheet S coming out of the secondary transfer nip 17 is fed upward and is guided from below to above with respect to the fixing device 19. The guiding members 18, 36 and 37 for feeding the sheet S from the secondary transfer nip 17 to the fixing nip N are formed by an inclined surface or a curved surface and are provided so as to be capable of guiding the sheet S to the fixing nip N with reliability.

To the sheet S, heat of the heater 39 is imparted via the belt 32 in a process in which the sheet S is nipped and fed through the fixing nip N. The unfixed toner images are melted by heat of the heater 39 and are fixed by pressure applied to the fixing nip N. Then, the sheet S nipped and fed in the fixing nip N passes through a guiding member 42 and an inner fixing discharging roller pair 43 and comes out of the fixing device 19 through a sheet exit 38. Further, the sheet S passes through a guiding member 20 and is sent to the discharge tray 22 by the discharging roller pair 21.

(Openable Door)

In the image forming apparatus 100 of the present invention, a right-side surface of the apparatus main assembly 100A is provided with an opening 100B as an access port during clearance of a jammed sheet and maintenance of an inside of the apparatus, and the like. Further, an openable door 100C movable between a predetermined closed position A (FIG. 2) where this opening 100B is closed and a predetermined open position B (FIG. 4) where the opening 100B is open is provided. In this embodiment, the openable door 100C is openable and rotatable about a lower hinge shaft 24 as a rotation center.

The openable door 100C is open-stopped and held by a locking operation of a locking mechanism (not shown) when the openable door 100C is sufficiently closed to the closed position A relative to the apparatus main assembly 100A as shown in FIG. 2. The image forming apparatus 100 is capable of performing an image forming operation in a state in which the openable door 100C is closed.

Figure 4:
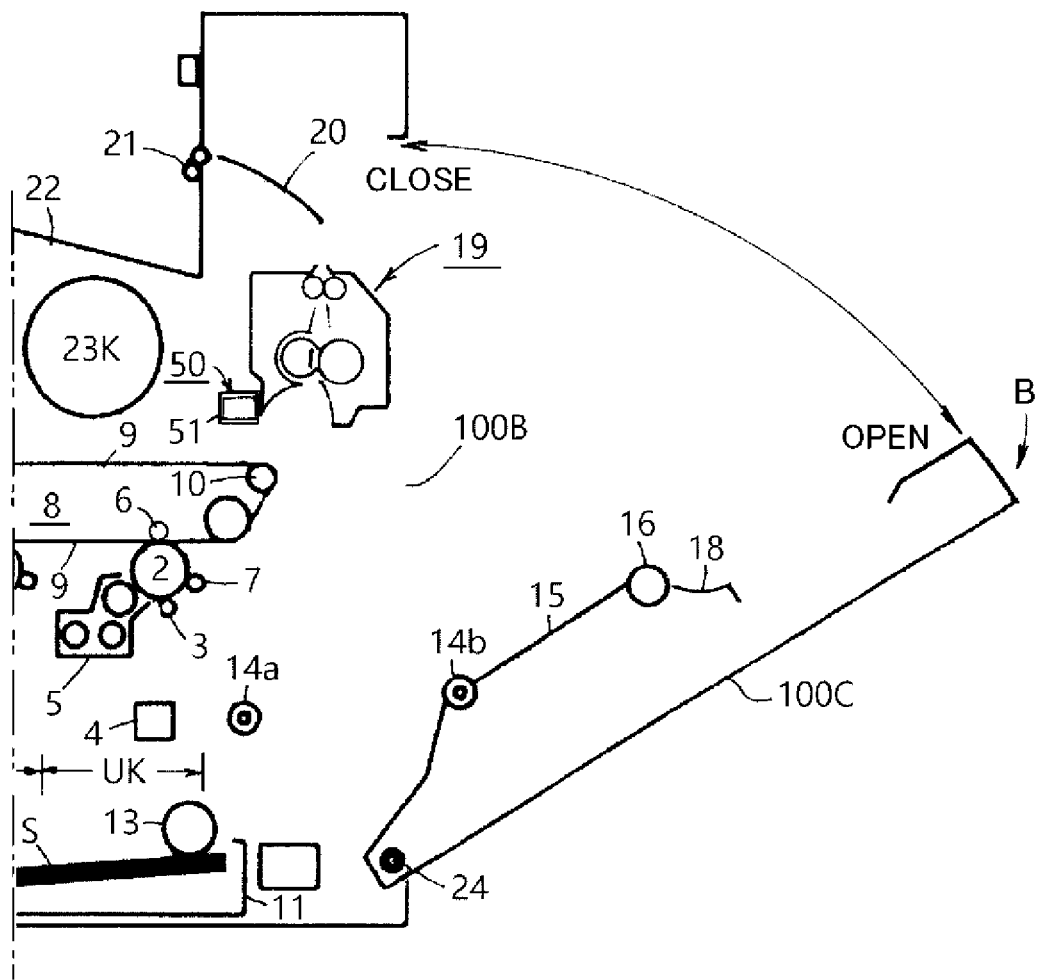
FIG. 4 is a view showing a state in which an openable door is opened.

The openable door 100C can be sufficiently rotated from the closed position A of FIG. 2 to the open position B as shown in FIG. 4 by lock release of the locking mechanism. Inside the openable door 100C, the one roller 14b of the registration roller pair 14a and 14b, the guiding member 15, the secondary transfer roller 16 and the guiding member 18 which are disposed in the upward feeding path 12 along which the sheet S is fed from below toward above are provided. Accordingly, the feeding path 12 is largely opened at the opening 100B on a right side of the apparatus main assembly 100A by opening the openable door 100C.

Figure 5:
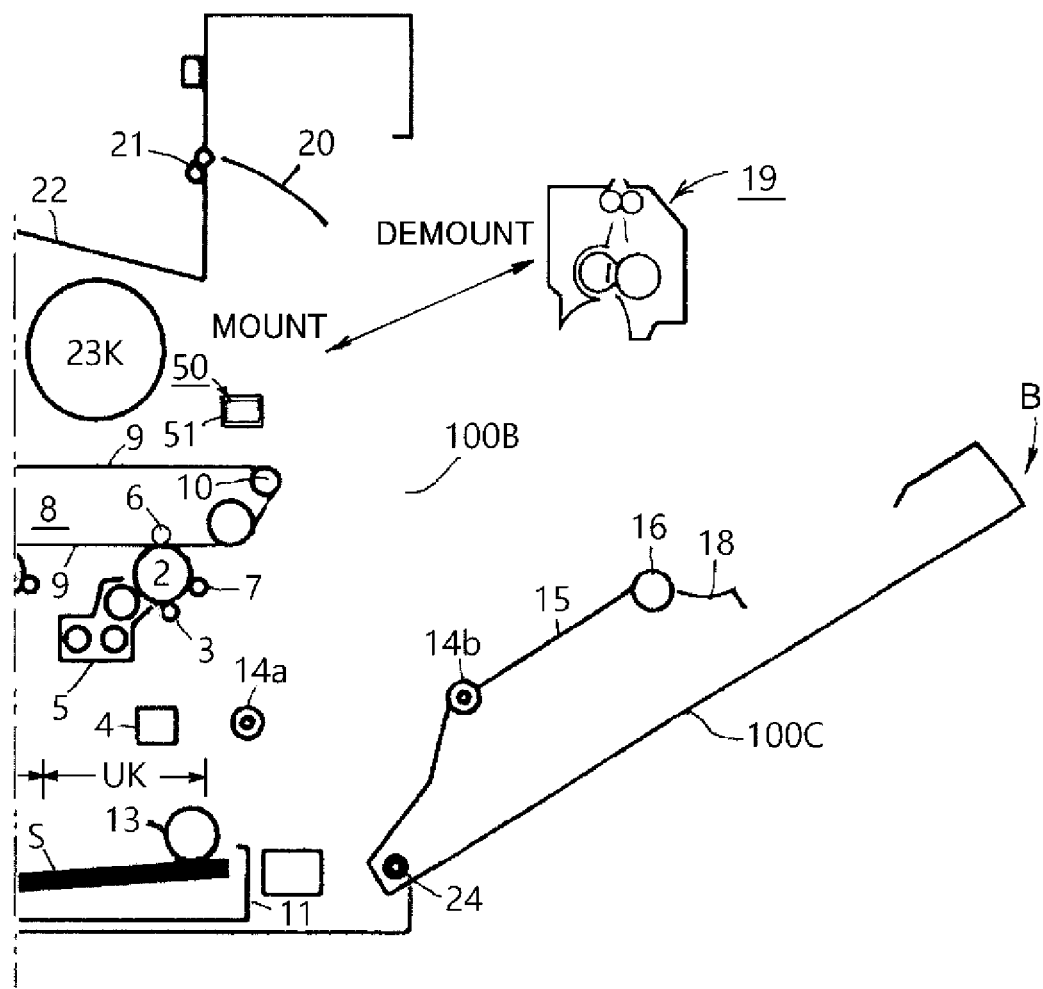
FIG. 5 is an illustration of mounting and demounting of a fixing device.

By this, removal of the sheet jammed in the feeding path 12 including the fixing device 19 (jam clearance) can be easily performed. Further, a constitution in which maintenance of the intermediary transfer belt 9 and the fixing device 19 and the like can also be easily performed is employed. In the image forming apparatus 1 of this embodiment, the fixing device 19 is provided so as to be mountable and demountable in a screw-less manner by a hooking structure or the like onto a predetermined mounting portion (not shown) in an inside of the apparatus main assembly 100A. Accordingly, a constitution in which mounting and demounting of the fixing device 19 relative to the mounting portion of the apparatus main assembly 100A can be easily performed in the screw-less manner by having access to the inside of the apparatus through the opening 100B opened by opening the openable door 100C as shown in FIG. 5 is employed.

(Mechanism of UFP Generation)

A manner of generation of UFP (dust) due to the parting agent of the toner will be described. The fixing device 19 fixes the toner image by bringing the belt 32 which is a high-temperature fixing member into contact with the sheet S. In the case where the fixing process is performed by using such a constitution, a part of the toner is transferred (deposited) on the belt 32 during the fixing process in some instances. This is called an offset phenomenon, but the offset phenomenon causes an image defect, and therefore, measures against the offset phenomenon are required to be taken.

Therefore, in the toner used in the image forming apparatus, a wax as the parting agent is incorporated. From this toner, the inner wax is melted and bleeds when the toner is heated, and therefore, when this toner image is subjected to the fixing process, the surface of the belt 32 is covered (coated) with the melted wax. The belt 32 of which surface is covered with the wax has an effect that the toner is not readily deposited on the belt surface by the parting (releasing) function of the wax.

Incidentally, in this embodiment, in addition to pure wax, a compound including a molecular structure of the wax is also called the wax. For example, a compound obtained by reaction of a toner resin molecule with a wax molecular structure such as a hydrocarbon chain is also called the wax. Further, as the parting agent, other than the wax, a substance having the parting function, such as silicone oil, may also be used.

When the wax is melted, a part thereof is vaporized (volatilized). This would be considered to occur because there is a variation in size of a molecular component contained in the wax. That is, it is considered that in the wax, a low molecular component which is short in molecular chain and which is low in boiling point and a high molecular (polymer) component which is long in molecular chain and which is high in boiling point are contained and the low molecular component low in boiling point is vaporized early. When the vaporized (gasified) wax component is cooled in the air, fine particles of a predetermined particle size (several nm to several hundreds of nm) generate (it is predicted that most of the fine particles have the particle size of several nm to several tens of nm). Specifically, the wax is fine particles of 5.6 nm or more and 560 nm or less in particle size. That is, the fine particles are the UFP described above.

The UFP generate by the above-described mechanism, and therefore, it is understood that the UFP most generate from the fixing nip N in which the heat is applied to the wax. Further, a side where the temperature of the belt 32 is highest is an upstream side of the fixing nip N due to rotation of the belt 32 and arrangement of the heater 39 and the like, and therefore, it can be predicted that a degree of the generation of the UFP is also maximum on the upstream side of the fixing nip N. Further, the UFP generate from the toner image transferred on the sheet S, and therefore, it is also understood that the UFP generate from an entire region of an image region of the fixing nip N.

(UFP Reducing Structure)

Next, a structure for reducing the UFP will be described. For reducing the UFP which are the fine particles of 5.6 nm or more and 560 nm or less in particle size, as described above, the generated UFP are collected by using a filter provided inside the apparatus main assembly and air suction. For that reason, it becomes possible to reduce an amount of the UFP discharged to the outside of the apparatus.

Here, as regards the arrangement of the filter, the filter is disposed in the neighborhood of the image region on the upstream side of the fixing nip N which is a maximum generation position of the UFP. Further, it is self-evident from the mechanism of the UFP generation described above in detail that when the air suction can be uniformly performed in the entire region of the filter with respect to the longitudinal direction, the UFP would be able to be collected most efficiently.

Figure 6:
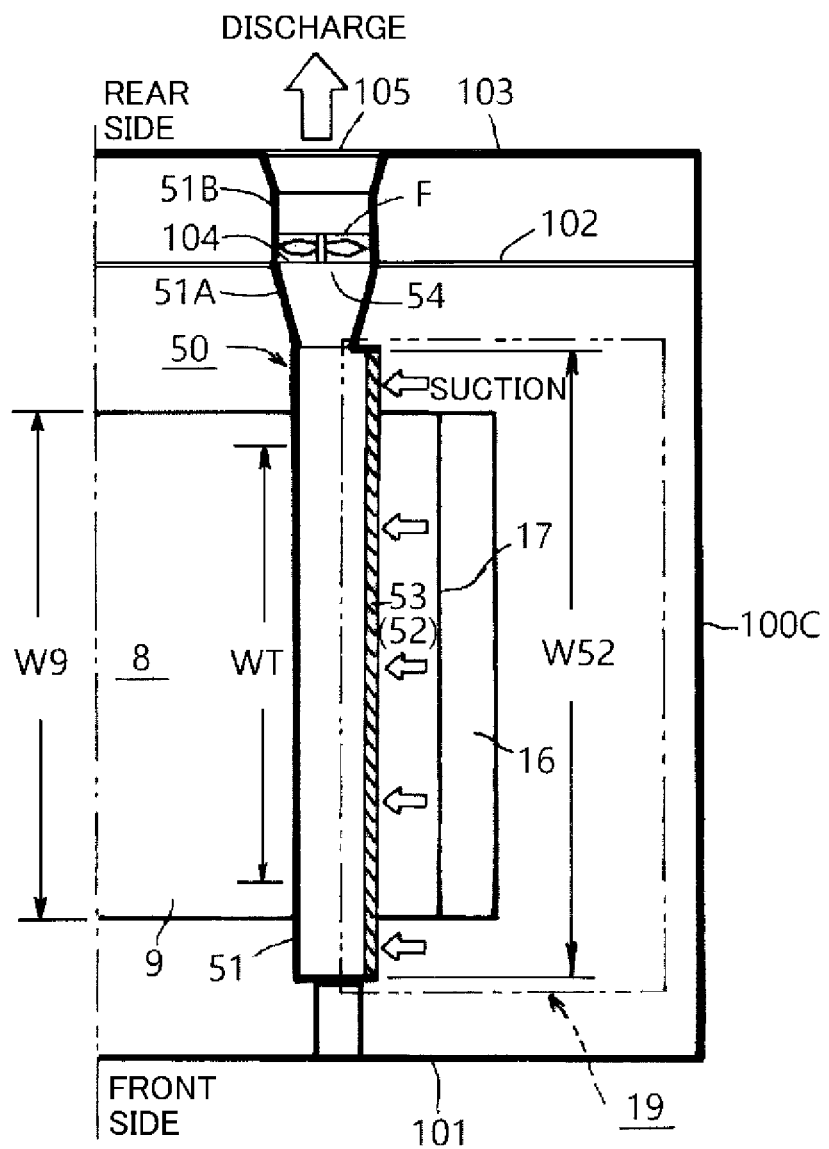
FIG. 6 is a schematic view seen in an arrow direction of (6)-(6) line in FIG. 3.

In the figures, a reference numeral 50 represents a duct unit as an UFP reducing structure in the image forming apparatus 100 of this embodiment. FIG. 6 is a schematic view seen in an arrow direction of (6)-(6) line in FIG. 3. The duct unit 50 is positioned between the secondary transfer portion (first position) 17 of the image forming portion 1 and the fixing nip (second position) N of the fixing portion 19. The duct unit 50 includes a suction port 52, a filter 53 for collecting (filtering) the UFP (particles resulting from the parting agent (wax)), and a duct 51 including a (air) discharge port 54 permitting discharge of the air to the outside of the apparatus.

The duct 51 in this embodiment is a hollow member which is long along the longitudinal direction of the fixing device 19 and which is substantially rectangular in cross-section. The suction port 52 extends along the longitudinal direction of the fixing nip N. The filter 53 is provided so as to cover this suction port 52. That is, the filter 53 is a flat surface member formed so that a longitudinal direction thereof extends in a direction perpendicular to the sheet feeding direction and is fixed to the suction port 52. The filter 53 is fixed to the frame member functioning as a holder mountable to and demountable from the duct 51. This frame member will be described later.

One end portion (front end portion) of the duct 51 is closed, and the other end portion (rear end portion) is increased in diameter as a bell mouse-shaped duct portion 51A and is opened as the discharge port 54.

In the image forming apparatus 100 of this embodiment, as a rear (surface) plate of the apparatus main assembly 100A, as shown in FIG. 6, a first rear plate 102 and a second rear plate 103 provided with a predetermined interval therefrom are provided. The first rear plate 102 and the second rear plate 103 are provided with a first opening 104 and a second opening 105, respectively, opposing each other. Further, the first opening 104 and the second opening 105 are connected by a fan duct 51B in which a fan F is incorporated.

The duct unit 50 is fixedly disposed inside the apparatus main assembly 100A at a predetermined mounting position between a front (surface) plate 101 and the first rear plate 102 so that the front end portion is on the front plate 101 side and the rear end portion is on the first rear plate 102 side and so that the duct unit 50 is mountable in and demountable from the apparatus main assembly 100A. A mounting structure of the duct unit 50 in the apparatus main assembly 100A will be described later.

In a state in which the duct unit 50 is mounted in the apparatus main assembly 100A in a predetermined manner, the discharge port 54 of the rear end portion of the duct 51 correspondingly coincides with the first opening 104 provided in the first rear plate 102.

That is, the discharge port 54 of the duct 50 communicates with the outside on the rear side of the apparatus main assembly 100A via the first opening 104, the fan duct 51B and the second opening 105. The fan F is controlled by the control circuit portion (not shown). The fan F is driven, the air flow generates in the duct 51 and the air in the duct 51 is discharged to the outside of the apparatus through the discharge port 54 along the above-described path. By this, the air is sucked in the duct 51 through the suction port 52 covered with the filter 53.

The duct 51 is disposed on a side (a side of the first rotatable member 32 provided with the heat source 39) of the belt unit 31 of the fixing device 16 between the secondary transfer portion 17 and the fixing nip N. Further, the suction port 52 of the duct 51 covered with the filter 53 is positioned further on the fixing nip N side than an intermediary portion between the secondary transfer portion 17 and the fixing nip N is, and further is positioned in the neighborhood of the fixing nip N.

That is, the suction port 52 covered with the filter 53 is disposed in the neighborhood of the upstream side of the fixing nip N and is disposed on the rear side of the guiding member 37. That is, the guiding member 37 exists in front of a frame member 55 (part (a) of FIG. 1), described later, to which the filter 53 of the duct unit 50 is fixed.

The duct unit 50 having the above-described structure sucks the air containing the UFP, existing between the secondary transfer portion 17 and the fixing nip N, in the duct 51 through the suction port 52 covered with the filter 53 while filtering the UFP with the filter 53. Further, a constitution in which the air from which the UFP are filtered by the filter 53 is discharged along a path of the discharge port 54, the first opening 104, the fan duct 51B and the second opening 105 is employed. That is, the UFP discharged to the outside of the apparatus by this duct unit 50 decreases.

The suction port 52 has a certain length with respect to a direction perpendicular to the sheet feeding direction as shown in FIG. 6. By this, a constitution in which the UFP generated from the wax transferred from the toner image on the sheet S onto the belt 32 can be collected with reliability with respect to the longitudinal direction (widthwise direction). In FIG. 6, W52 is a length of the suction port 52 with respect to the longitudinal direction, and WT is a width (maximum image width) of an image formable region on the sheet. W9 is a width of the intermediary transfer belt 9. The length W52 of the suction port 52 is set so as to exceed the maximum image width WT.

Incidentally, in the case where the image forming apparatus is capable of utilizing the sheets S having a plurality of large and small width sizes, with respect to the width size highest in use frequency, the width sizes may only be required to be set to satisfy W52>WT. In the case where the use frequency of the sheet S having a smallest width size is high, on the basis of a maximum image width T of the smallest width size-sheet, the length W52 of the suction port 52 with respect to the longitudinal direction can be set so as to satisfy W52>WT. That is, the length W52 of the suction port 52 is a length of the maximum image width WT of the minimum width size-sheet usable in the apparatus.

Further, in the case where the use frequency of the sheet S having a largest width size is high, on the basis of the maximum image width WT of the largest width size-sheet, the length W52 of the suction port 52 with respect to the longitudinal direction can be set so as to satisfy W52>WT. That is, the length W52 of the suction port 52 is a length of the maximum image width WT of the maximum width size-sheet usable in the apparatus.

Further, the suction port 52 is, as shown in FIG. 3, not only disposed in the neighborhood of the belt 32 but also is in a position opposing the sheet S which will enter the fixing device 19. By such arrangement, the duct unit 50 can be downsized. That is, the suction port 52 is in the neighborhood of the belt 32 which is a dust generation portion, and simultaneously, is disposed at the position opposing the sheet S. By this, the duct unit 50 can omit the path along which the air is guided from the fixing nip N to the suction port 52, so that entirety of the apparatus is easily downsized.

The fan F for sucking the air in the duct 51 is fixed in a shortest path via the duct 51 at the end portion. By this, it is first understood that arrangement of the filter 53, the duct 51 and the fan F has a shortest path.

Further, the filter 53 is disposed by being extended in the longitudinal direction of the suction port 52 of the duct 51, and therefore, pressure loss on the upstream side through the filter 53 and pressure loss on the downstream side through the filter 53 are substantially the same with respect to the longitudinal direction, and an air sucking force through the suction port 52 is also substantially the same between the front side and the rear side. That is, an air flow distribution along the longitudinal direction of the suction port of the air sucked through the suction port 52 is substantially uniform.

Accordingly, by employing the above-described arrangement of the filter 53, the duct 51 and the fan F, the air can be substantially uniformly sucked through the filter 53 from an entire image region of the fixing nip N. Consequently, it is understood that the UFP generated from the entire image region of the fixing nip N can be collected substantially uniformly.

Further, an air sucking force can also be lowered by optimizing the air suction by the above-described arrangement, so that cost reduction and downsizing of the fan F can also be realized.

From the above, by employing cross-sectional arrangement shown in FIG. 2, FIG. 3 and FIG. 6, the UFP reducing structure can be arranged at a low cost and with space saving and high efficiency.

(Detailed Structure of Duct Unit)

Here, by disposing the guiding member 37 in front of the filter 53, the fed sheet S is contrived so as not to directly contact the filter 53, but there is also a possibility that the sheet S is violently fed depending on a state of the sheet S such as the case where the sheet S is in the habit of curling or the like. In that case, the sheet S vibrates during feeding due to such that the sheet S does not smoothly enter the fixing nip N, and toner in a small amount scatters from the unfixed toner image formed on the sheet, so that the toner is gradually deposited on the surface of the filter 53.

In this state, a collecting area of the filter 53 for collecting the UFP decreases, so that the UFP reducing effect lowers. Accordingly, when many images each having a large toner amount are outputted or the sheet liable to be violently fed during feeding is used, depending on a use condition of the filter, the UFP reducing effect of the filter 53 lowers early. For that reason, in order to maintain an initial performance of the filter 53, it is predicated that exchange of the filter 52 has to be made at high frequency.

From the above, in the case where the above-described filter and duct arrangement are employed, instead of cost reduction and downsizing, a constitution in which the exchange of the filter 53 can be easily made has been required.

Further, for the exchange, an upstream portion of the fixing nip N where the above-described filter arrangement is employed is also the neighborhood of a rearmost portion of an engine of the image forming apparatus, and therefore, access to a position thereof also requires attention to deposition of the toner or the like while avoiding peripheral portions such as the intermediary transfer belt 9 and other units and component parts. Accordingly, when the filter 53 is exchanged, it is also required that the exchange of the filter 53 is reliably made so that the filter 53 having a flat surface is prevented from being broken such as tearing and is prevented from being contaminated such as deposition of the toner.

Figure 7:
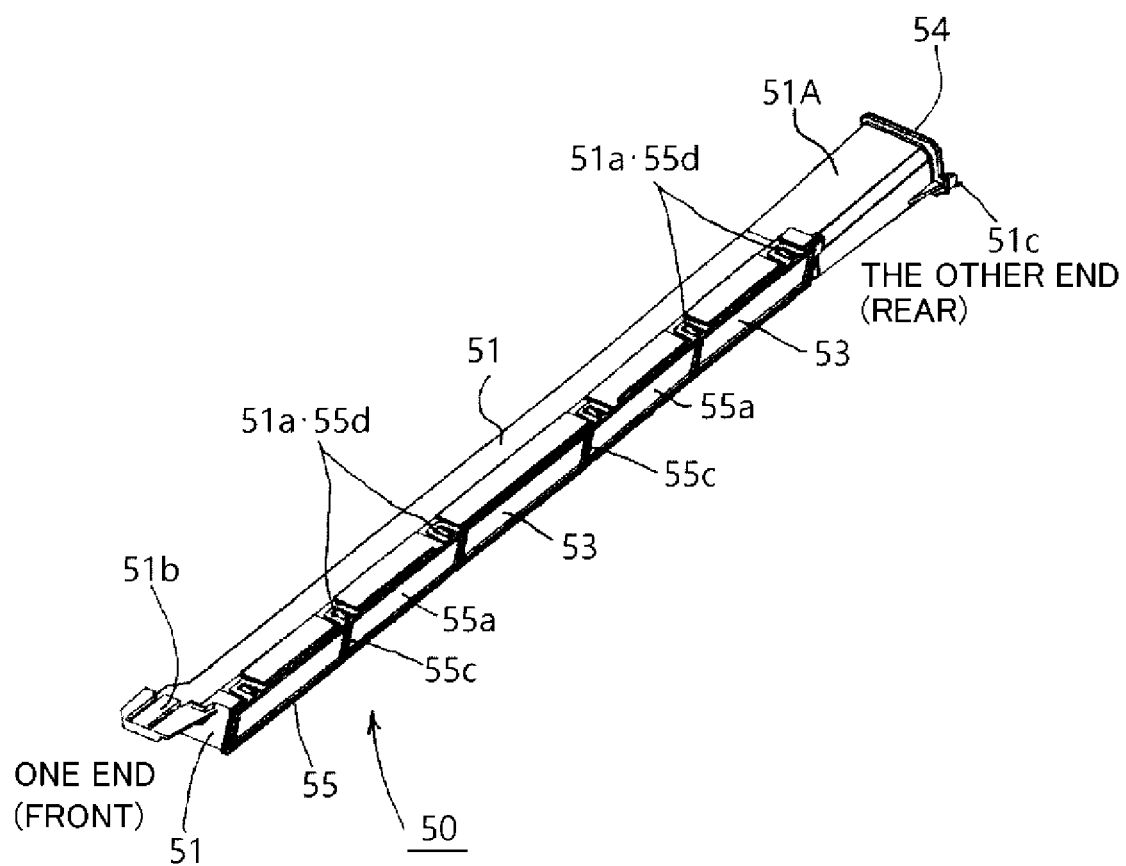
FIG. 7 is a perspective view of an outer appearance of a duct unit.
Figure 8:
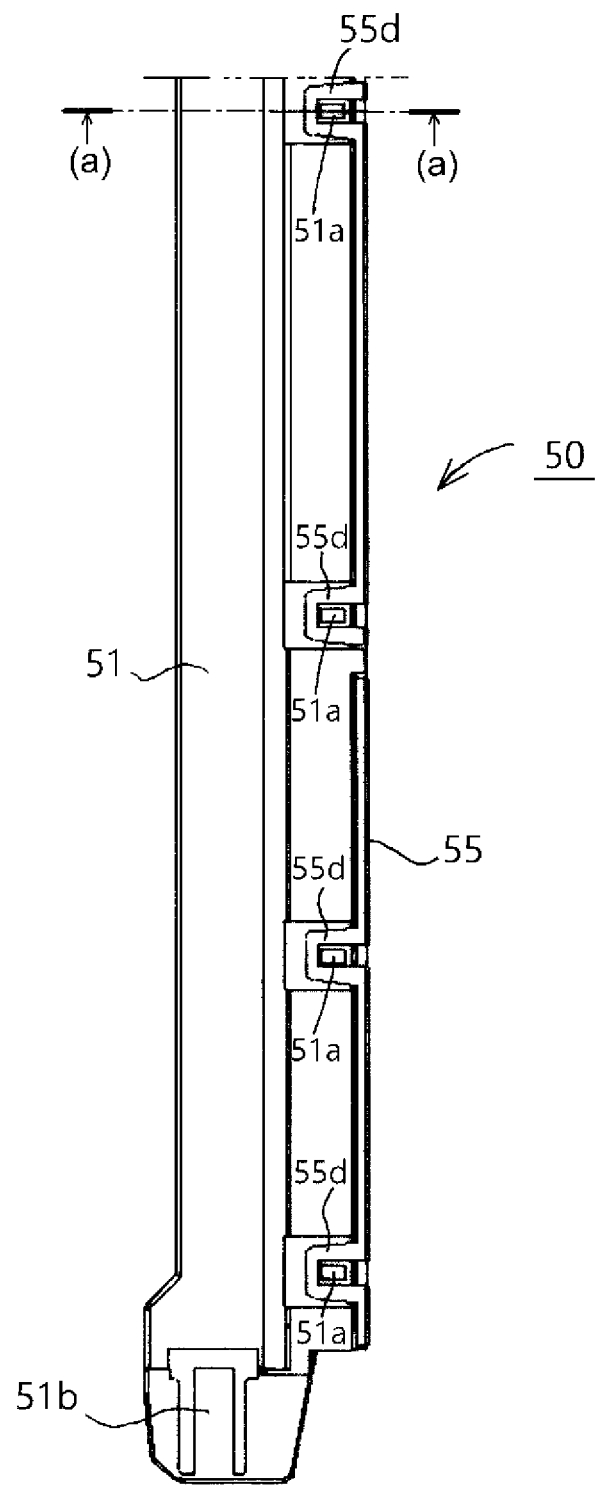
FIG. 8 is an enlarged plan view of the duct unit on one longitudinal end portion side.

Therefore, the duct unit 50 in this embodiment has a structure such that the exchange of the filter 53 can be made easily and reliably. This will be described with reference to the drawings. FIG. 7 is a perspective view of an outer appearance of the entirety of the duct unit 50. FIG. 8 is an enlarged plan view of this duct unit 50 on one longitudinal end portion side. Part (a) of FIG. 1 is an enlarged sectional view seen in an arrow direction of (a)-(a) line, and part (b) of FIG. 1 is an enlarged sectional view showing a state (separated state) in which the frame member 55 to which the filter 53 is kept fixed is demounted (removed) from the duct unit 50 in part (a) of FIG. 1.

The duct unit 50 includes the duct 51 provided with the suction port 52 and the discharge port 54, the filter 53 for collecting dust resulting from the parting agent, and the frame member 55 to which the filter 53 is fixed.

In this embodiment, the duct 51 is a substantially rectangular hollow member in cross-section long in the longitudinal direction of the fixing device 19 as described above. The suction port 52 is formed as an opening extending along the longitudinal direction on one side surface of the duct 51 with respect to the longitudinal direction. That is, the suction port 52 extends along the longitudinal direction of the fixing nip N. One end portion side (front end portion) of the duct 51 is closed, and the other end portion side (rear end portion) of the duct 51 is opened as the discharge port 54. Further, at a position closer to the discharge port of the duct 51, the fan duct 51B (FIG. 6) including the fan F is provided as a member of the apparatus main assembly side. That is, the duct unit 50 communicates with the fan duct 51B including the fan F on the apparatus main assembly side.

The filter 53 is fixed to the frame member 55, and this frame member 55 is fixed to the suction port 52 of the duct 51 so as to be mountable to and demountable from the suction port 52. The frame member 55 extends along the longitudinal direction of the suction port 52 corresponding to the suction port 52. The filter 53 is a flat surface filter formed so that the longitudinal direction thereof extends in a direction perpendicular to the sheet feeding direction, and by this, the filter 53 is disposed on the suction port 52 so as to cover an entire region of the suction port. That is, the duct 51 has a structure such that the duct 51 is provided at a side surface thereof with an opening which is the suction port 52 and that the suction port 52 is covered with the filter 53.

The filter 53 is fixed to the frame member 55 by a double-side tape, welding or the like, and the frame member 55 is mounted to the suction port 52 of the duct 51, so that the suction port 52 is covered with the filter 53 with no gap. At that time, as shown by a coarsely hatched portion of part (b) of FIG. 1, a filter fixing surface 55b of the frame member 55 is in a minimum range in which only a filter end (edge) portion 53a exists. That is, consideration such that an effective area of the filter 53 facing the outside of the frame member 55 through a window hole 55a is not decreased is given.

A shape of the frame member 55 is formed as a ladder-shaped member including a door-frame-like portion which is a fixed surface 55b and a cross-bar-shaped portion 55c for preventing floating or deviation of the filter 53.

Based on above, when the filter 53 is mounted to and demounted from the duct unit 50, the frame member 55 to which the filter 53 is fixed is mounted to and demounted from the suction port 52 of the duct 51. By this, compared with mounting and demounting of a soft flat surface sheet-like filter alone, not only a risk of breakage such as tearing due to hooking can be made small, but also the mounting and demounting become easy.

As an engaging mechanism between the frame member 55 holding the filter 53 and the duct 51, an engaging portion capable of being easily demounted is employed. Specifically, an engaging portion of a hook engagement type using a hooking portion and a hooked (portion-to-be-hooked) is employed. More specifically, the engagement is carried out by hooking a holding portion 55d which is formed on the frame member 55 side and which has elasticity, on projection-shaped portions 51a formed at an upper surface and a lower surface of the duct 51 shown in part (b) of FIG. 1. A so-called snap-hooking type is employed.

At this time, the filter 53 is fixed to the frame member 55 on the duct 51 side. Then, in the case where the frame member 55 is fixed to the duct 51, as shown in part (a) of FIG. 1, a state in which the edge portion 53a of the filter 53 is sandwiched between the duct 51 and the frame member 55 is formed. Further, the engaging portion also performs a function of compressing the filter 53 in a predetermined amount between the frame member 55 and the duct 51. That is, a gap created between the duct 51 and the frame member 55 is filled with the filter 53, so that hermeticity of the duct can be ensured by this minimum component part structure.

By this structure, it is understood that air sucked in the duct 51 of the duct unit 50 reliably passes through the filter 53 without removing an advantage such as a small size. Further, it is also understood that mounting and demounting of the filter 53 are freely performed with respect to an arrow X-Y direction of part (b) of FIG. 1 integrally with the frame member 55 by engagement and disengagement of the hooking portion 55d of the frame member 55 to which the filter 53 is fixed, relative to the projection-shaped portion 51a provided on the duct 51 side.

(Mounting and Demounting Structure of Duct Unit)

The duct 51 of the duct unit 50 includes a first engaging portion 51b and a second engaging portion 51c on one end portion side (front end portion) and the other end portion side (rear end portion), respectively, with respect to the longitudinal direction. On the other hand, the apparatus main assembly 100A includes a first portion-to-be-engaged 56a corresponding to the above-described to first engaging portion 51b and a second portion-to-be-engaged 102a corresponding to the above-described second engaging portion 51c.

In this embodiment, in the apparatus main assembly 100A, a fixing base 56 for fixing the duct unit 50 is provided. This fixing base 56 is disposed at the side of the fixing portion inside the apparatus main assembly 100A. The above-described first portion-to-be-engaged 56a is provided on the one end portion side (front end portion) of this fixing base 56. Further, the second portion-to-be-engaged 102a is provided on the first rear plate 102 of the apparatus main assembly 100A.

More specifically, in this embodiment, the first engaging portion 51b is a hook-shaped member which projects from the front side toward the rear side and which has elasticity. The second engaging portion 51c is a projection member which projects from the front side toward the rear side. Further, the first portion-to-be-engaged 56a is an arm member provided with a locking surface with which the hook-shaped member as the first engaging portion 51b is engaged and from which the hook-shaped member is disengaged. The second portion-to-be-engaged 102a is an engaging hole in which the projection member as the second engaging portion 51c is inserted and from which the projection member is extracted.

1) Fixing of Duct Unit

Fixing of the duct unit 50 to the apparatus main assembly 100A is carried out by engaging the first and second engaging portions 51b and 51c on the duct 51 side with the first and second portions-to-be-engaged 56a and 102a on the apparatus main assembly 100A side, respectively. In this embodiment, this fixing is made by engaging the first and second engaging portions 51b and 51c with the first and second portions-to-be-engaged 56a and 102a, respectively, through movement of the duct 51 of the duct unit 50 in one longitudinal direction to (a direction from the front side toward the rear side) as in an arrow K direction of FIG. 9B.

That is, by moving the duct unit 50 toward the first rear plate 102 direction, the projection member as the second engaging portion 51c on the duct unit 50 side is engaged in the engaging hole as the second portion-to-be-engaged 102a, so that the rear end portion of the duct unit 50 is fixed. Further, the elastic hook-shaped member as the first engaging portion 51b on the duct unit 50 side is engaged with the arm member as the first portion-to-be-engaged 56a (part (a) of FIG. 10), so that the front end portion of the duct unit 50 is fixed.

Figure 9A:
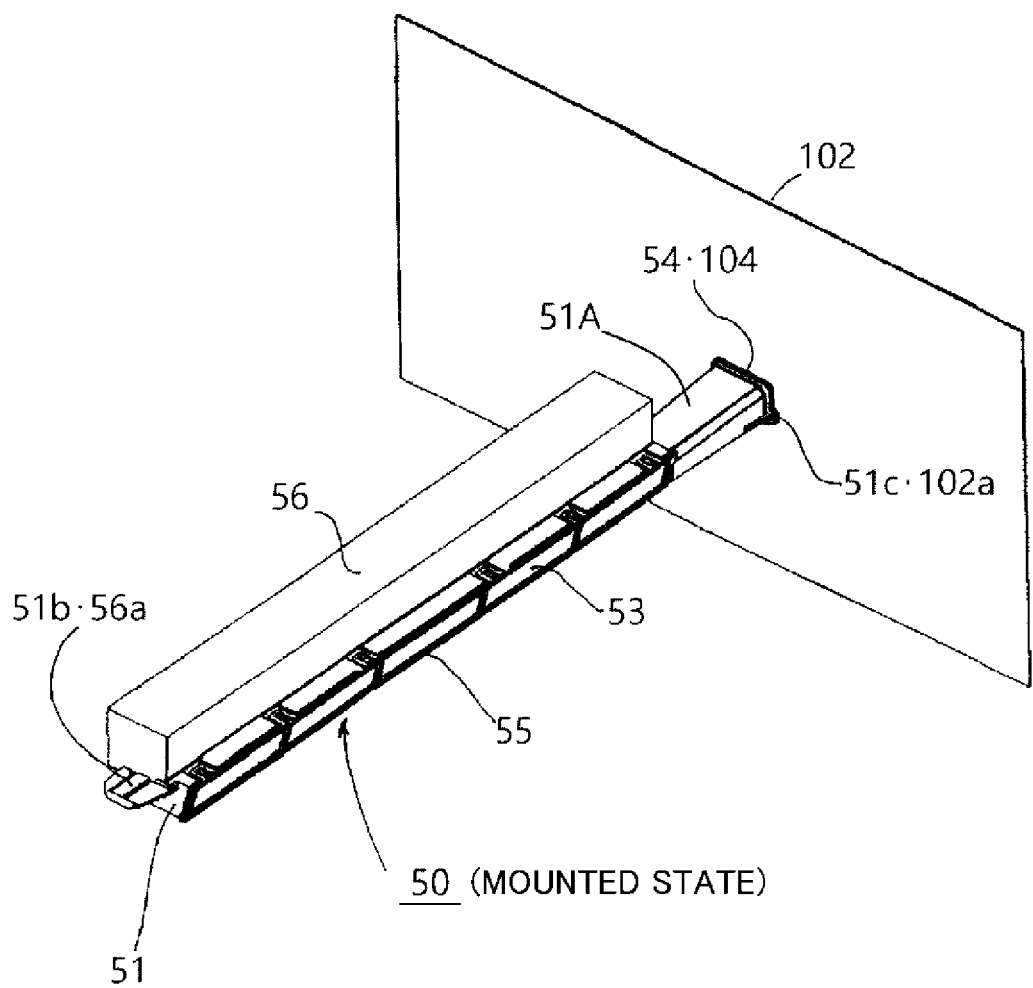
FIG. 9A is a perspective view of the duct unit mounted in a predetermined mounting position of an apparatus main assembly.

FIG. 9A shows a state in which the duct unit 50 is mounted in a predetermined manner at a predetermined mounting position inside the apparatus main assembly 100A by engagement of the first second engaging portions 51b and 51c with the first and second portions-to-be-engaged 56a and 102, respectively, as described above.

2) Demounting of Duct Unit

Demounting of the duct unit 50 fixed to the apparatus main assembly 100A (FIG. 9A) is carried out by releasing engagement of the first and second engaging portions 51*b* and 51*c* on the duct 51 side with the first and second portions-to-be-engaged 56*a* and 102*a* on the apparatus main assembly 100A side, respectively. In this embodiment, this demounting is made by engaging the first and second engaging portions 51*b* and 51*c* from the first and second portions-to-be-engaged 56*a* and 102*a*, respectively, through movement of the duct 51 of the duct unit 50 in the other longitudinal direction (a direction rear the front side toward the front side) as in an arrow J direction of FIG. 9B.

That is, by moving the duct unit 50 toward the first rear plate 102 direction, the projection member as the second engaging portion 51*c* on the duct unit 50 side is disengaged from the engaging hole as the second portion-to-be-engaged 102*a*, so that the fixing of the rear end portion of the duct unit 50 is released. Further, the elastic hook-shaped member as the first engaging portion 51*b* on the duct unit 50 side is disengaged from the arm member as the first portion-to-be-engaged 56*a* against elasticity of the hook-shaped image (part (b) of FIG. 10), so that the fixing of the front end portion of the duct unit 50 is released.

Figure 9B:
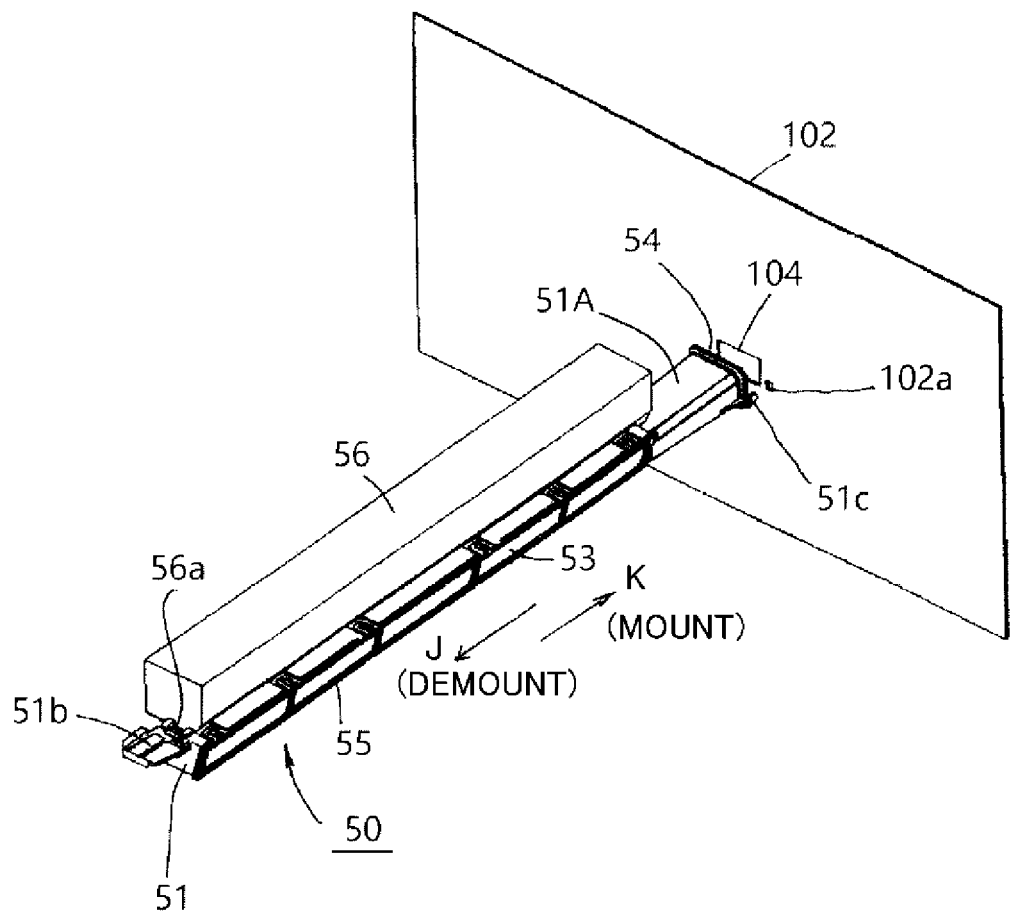
FIG. 9B is an illustration of a mounting and demounting manner of the duct.

FIG. 9B shows a state in which the duct unit 50 is demounted from the apparatus main assembly 100A by disengagement of the first and second engaging portions 51*b* and 51*c* from the first and second portions-to-be-engaged 56*a* and 102, respectively, as described above.

Figure 10:
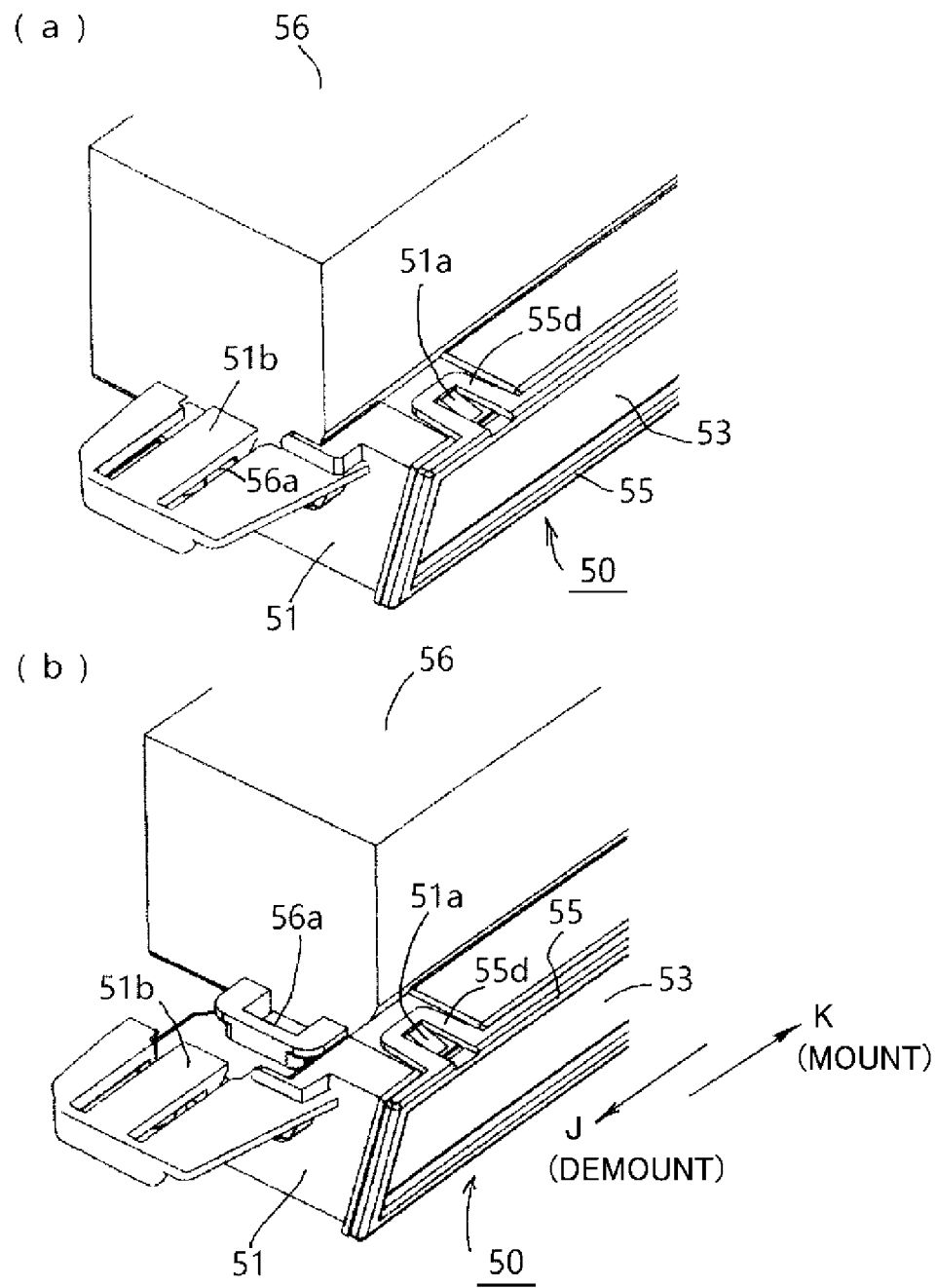
FIG. 10 includes illustrations of engaging and disengaging states of a first engaging portion relative to a first portion-to-be-engaged.

FIG. 10 shows a structure of the first engaging portion 51*b* on the duct 51 side of the duct unit 50 and the first portion-to-be-engaged 56*a* on the fixing base 56 side with which the first engaging portion 51*b* is engaged and from which the first engaging portion 51*b* is disengaged. The first engaging portion 51*b* on the duct 51 side has the hook shape having elasticity, and the first portion-to-be-engaged 56*a* on the fixing base 56 side is illustrated as an arm provided with a locking surface on which the hook is locked.

In part (a) of FIG. 10, a state in which the first engaging portion 51*b* engages with the first portion-to-be-engaged 56*a* is shown, and in part (b) of FIG. 10, a state in which the engagement is released is shown. From a positional relationship between the first engaging portion 51*b* and the first portion-to-be-engaged 56*b* shown in both the figures, it is understood that the engagement of the first engaging portion 51*b* with the first portion-to-be-engaged 56*b* is made by moving the duct unit 50 toward the first rear plate 102 side as indicated by the arrow K. Further, it is understood that in a reverse manner, by moving the duct unit 50 toward the front plate 101 side as indicated by an arrow J, the engagement of the first engaging portion 51*b* with the first portion-to-be-engaged 56*a* is released (eliminated).

From the above, it is understood that the fixing of the duct unit 50 to the apparatus main assembly 100A can be carried out only by moving the duct unit 50 toward the first rear plate 102 side. Further, it is understood that the demounting of the duct unit 50 from the apparatus main assembly 100A can be carried out by moving the duct unit 50 toward the front plate 101 side. Further, the first rear plate 102 is provided with the first opening 104, and by fixing the duct unit 50 to the apparatus main assembly 100A, the discharge port 54 at the rear end portion of the duct 51 correspondingly coincides with the first opening 104 and communicates with the first opening 104. By this, it is also understood that an air flow path from the fan duct 51B to the second opening 105 is established.

(Exchange Procedure of Filter)

Access to the inside of the apparatus main assembly 100A of the image forming apparatus is possible by largely opening the opening 100B by opening the openable door 100B described with reference to FIG. 4 and FIG. 5. Further, the fixing device 19 can be demounted to the outside of the apparatus main assembly 100A by access to the fixing device 19 through the opening 100B. As described above, mounting and demounting of the fixing device 19 are carried out in the screw-less manner, and therefore, the state of FIG. 5 can be easily formed although the fixing device 19 is disposed on the rear side of the apparatus main assembly. Further, by demounting the fixing device 19, it becomes easy to access to the duct unit 50 inside the apparatus main assembly 100A through the opening 100B.

Based on the above, the exchange procedure of the filter 53 is the following flow.

1) By opening the openable door 100C, the fixing device 19 is taken out through the opening 100B (FIG. 5). By this, it is possible to access to the duct unit 50 (FIG. 9A), through the opening 100B, mounted inside the apparatus main assembly 100A.

2) A service person or the user puts his (her) hand in the apparatus main assembly 100A through the opening 100B and grips the duct unit 50, and moves the duct unit 50 toward the front side of the apparatus main assembly 100A as indicated by the arrow J of FIG. 9B. By this, as described above, the first and second engaging portions 51*b* and 51*c* are disengaged from the first and second portions-to-be-engaged 56*a* and 102*a*, respectively, so that the duct unit 50 is demounted from the apparatus main assembly 100A.

Figure 9C:
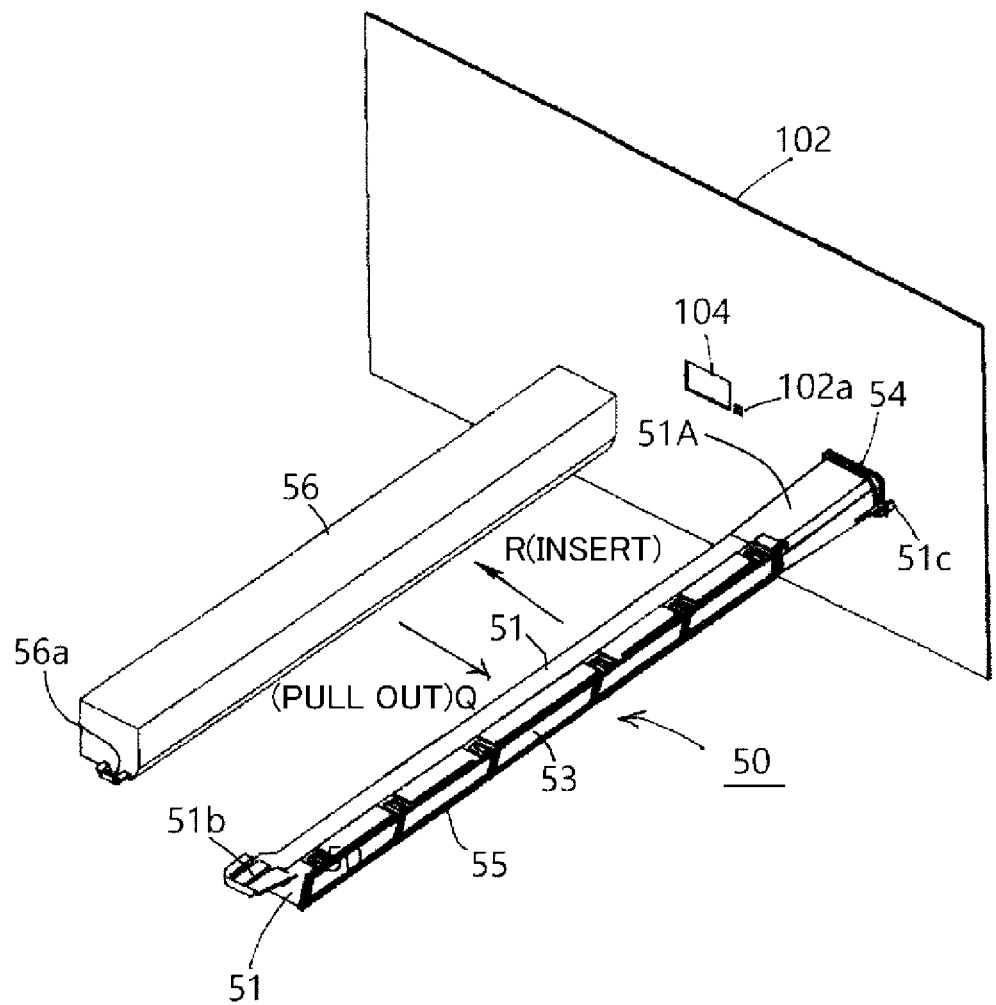
FIG. 9C is an illustration of a pulling-out and inserting manner of the duct unit relative to the apparatus main assembly.

3) The service person pulls out the duct unit 50 in an arrow Q direction of FIG. 9C while gripping the duct unit 50 demounted from the apparatus main assembly 100A, and is taken out of the apparatus main assembly through the opening 100B.

4) Then, the service person demounts the frame member 55 provided with the filter from the duct 51 of the duct unit 50 as shown in part (b) of FIG. 1. Then, to the duct 51 from which the frame member 55 is demounted, a frame member 55 to which a clean filter 53 is fixed is mounted.

5) Thus, the duct unit 50 subjected to old-to-new exchange (replacement) of the frame member 55 provided with the filter is inserted into the apparatus main assembly 100B through the opening 100B as indicated by an arrow R of FIG. 9C.

6) Then, the first and second engaging portions 51*b* and 51*c* on the duct unit 50 side are correspondingly positioned to the first and second portions-to-be-engaged 56*a* and 102*a* on the apparatus main assembly 100A side, respectively, and the duct unit 50 is moved toward the rear side of the apparatus as indicated by the arrow R of FIG. 9C. By this, as described above, the first and second engaging portions 51*b* and 51*c* engage with the first and second portions-to-be-engaged 56*a* and 102*a*, respectively, so that the duct unit 50 is fixed at the predetermined mounting position of the apparatus main assembly 100A as shown in FIG. 9A.

7) The fixing device 19 is inserted into the apparatus main assembly 100A through the opening 100B and is mounted in a predetermined mounting portion.

8) Then, the openable door 100C is closed to the apparatus main assembly 100A, so that the opening 100B is closed and thus the exchange of the filter 53 of the duct unit 50 is completed.

The above-described procedures of the demounting and re-mounting of the duct unit 50 are all performed with no troublesome operation such as removal of screws or the like. Further, both the release of engagement of the duct unit 50 from the apparatus main assembly 100A and the demounting of the duct unit 50 from the apparatus main assembly 100A are performed in a state of the unit which is easily held, and therefore, it is understood that the risk of the breakage and contamination of the fixing becomes minimum.

The fixing of the filter to the apparatus is carried out in a reverse procedure to the above-described demounting procedure, and therefore, it is understood that the demounting and mounting procedure of the filter, i.e., the exchange procedure of the filter, is easy.

As described above in detail, it is understood that the exchange of the filter can be carried out easily and reliably without removing advantages such as a low cost, a small size and high efficiency.

<<Other Matters>>

1) The present invention is not limited to the above-described embodiment, but for example, as regards the engaging mechanism between the frame member 55 and the duct 51, an arrangement relationship between the hooking portion and the hooked portion may be any relationship. That is, a constitution in which the duct 51 is provided with the hooking portion and the frame member 55 is provided with the hooked portion may also be employed.

2) The fixing device 19 may be of a heating roller type and may also be of a type utilizing electromagnetic induction heating.

3) The suction port 52 may also be provided on the pressing roller 33 side with respect to the sheet feeding path. The suction port 52 may also be provided on both the belt 32 side and the pressing roller 33 side. The fan F may be a cross-flow fan or a blower fan.

4) The sheet feeding path is not limited to a vertical path structure, but may also be a horizontal path type or a type in which the sheet is fed obliquely.

5) In the embodiment, as the image forming apparatus 100, a multi-function printer including a plurality of the drums 2 was described. However, to a monochromatic multi-function printer or single function printer, which includes a single drum 2, the present invention is also applicable. Accordingly, the image forming apparatus according to the present invention is not limited to the multi-function printer.

INDUSTRIAL APPLICABILITY

According to the present invention, there is provided an image forming apparatus capable of reducing the dust.

The invention claimed is:

1. An image forming apparatus comprising:
   an image forming portion configured to form a toner image on a sheet at a first position by using toner containing a parting agent;
   a fixing portion configured to thermally fix the toner image, at a second position, formed on the sheet by said image forming portion;
   a duct, including a suction port provided opposed to a sheet feeding path between the first position and the second position, configured to discharge air to an outside of said image forming apparatus;
   a filter, provided in the suction port of said duct, configured to collect particles of a predetermined particle size resulting from the parting agent;
   a holder configured to hold said filter; and
   a hooking portion and a hooked portion configured to engage between said holder and said duct.

2. An image forming apparatus according to claim 1, wherein said hooking portion is provided on said holder and said hooked portion is provided on said duct.

3. An image forming apparatus according to claim 1, further comprising a guiding portion configured to guide a back surface of the sheet from the first position to the second position,
   wherein said suction port is in an opposing positional relationship with said guiding portion through the sheet feeding path.

4. An image forming apparatus according to claim 3, wherein the second position is above the first position with respect to a direction of gravitation.

5. An image forming apparatus according to claim 1, wherein the second position is above the first position with respect to a direction of gravitation.

6. An image forming apparatus according to claim 1, wherein an engagement of said hooking portion and said hooked portion is configured to compress said filter in a predetermined amount between said holder and said duct.

7. An image forming apparatus according to claim 1, wherein the parting agent is a wax, and the predetermined particle size is 5.6 nm or more and 560 nm or less.

8. An image forming apparatus according to claim 1, further comprising a fan configured to form an air flow in said duct.

* * * * *